United States Patent [19]

Verbicky, Jr. et al.

[11] Patent Number: 4,742,150

[45] Date of Patent: May 3, 1988

[54] SOLVENT RESISTANT POLYETHERAMIDEIMIDE CONTAINING BENZANILIDE UNITS

[75] Inventors: John W. Verbicky, Jr., Scotia; Elbridge A. O'Neil, Port Henry; Mark J. Bausch, Schenectady, all of N.Y.

[73] Assignee: General Electric Company, Schenectady, N.Y.

[21] Appl. No.: 911,611

[22] Filed: Sep. 25, 1986

[51] Int. Cl.$^4$ ............................................. C08G 73/10
[52] U.S. Cl. .................................. 528/208; 528/207; 528/211; 528/329.1; 528/331; 528/351; 528/352; 528/353

[58] Field of Search ............... 528/208, 207, 211, 331, 528/353, 351, 352, 329.1

[56] References Cited

U.S. PATENT DOCUMENTS 3,179,635 4/1965 Frost et al. ........................... 528/208
3,282,897 11/1966 Angelo ................................. 528/208

Primary Examiner—Harold D. Anderson
Attorney, Agent, or Firm—William A. Teoli; James C. Davis, Jr.; James Magee, Jr.

[57] ABSTRACT

Polyetheramideimide is provided and method for making. There are utilized aromatic bis(etheranhydride) and diaminobenzanilide or mixtures thereof with an organicdiamine. The polyetheramideimide has been found to have improved solvent resistance.

7 Claims, No Drawings

SOLVENT RESISTANT POLYETHERAMIDEIMIDE CONTAINING BENZANILIDE UNITS

BACKGROUND OF THE INVENTION

Prior to the present invention, as shown by U.S. Pat. No. 3,847,867, Heath et al., assigned to the same assignee as the present invention and incorporated herein by reference, polyetherimides were made by reacting certain aromatic bis(etheranhydride) and organic diamine. Although the Heath et al. polyetherimides are injection-moldable and can be reinforced and converted to high performance thermoplastics or composites, efforts are constantly being made to improve the solvent-resistance of such shaped thermoplastics or high-performance composites.

The present invention is based on the discovery that solvent-resistant polyetheramideimides can be made by effecting reaction between aromatic bis(etheranhydride) "BPA-DA" of the formula,

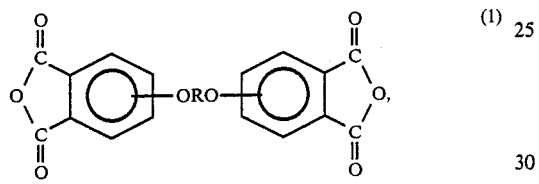 (1)

and diaminobenzanalide "DABA" of the formula,

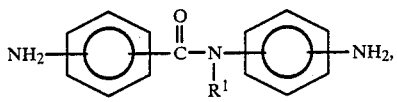 (2)

or a mixture of DABA and a phenylenediamine, "PDA" of the formula,

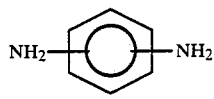 (3)

where R is a divalent $C_{(6-30)}$ aromatic organic radical defined more particularly below, and $R^1$ is a $C_{(1-14)}$ monovalent hydrocarbon radical or a $C_{(1-14)}$ monovalent hydrocarbon radical substituted with one or more radicals neutral during intercondensation.

It has been found that improved solvent resistance can be imparted to the resulting polyetheramideimide if at least 10 mol percent of DABA is used in the diamine mixture of Formulas (2) and (3) based on the total mols of DABA and PDA utilized during intercondensation with BPA-DA of Formula (1). In addition, crystalline polyetherimide can be made from DABA isomer 4,4'-diaminobenzanilide and BPA-DA isomer 2,2-bis[4-(3,4-dicarboxyphenoxy)]propane dianhydride when polymerized under neat conditions.

STATEMENT OF THE INVENTION

There is provided by the present invention, solvent-resistant polyetheramideimide comprising chemically combined etherimide units of the formula,

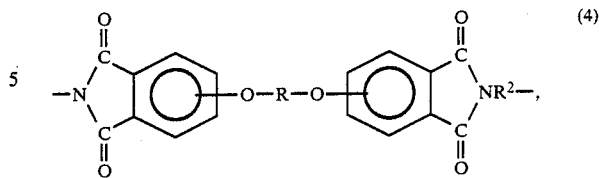 (4)

where R is as previously defined, and $R^2$ is selected from a mixture of 0–90 mol percent of phenylene units of the formula,

 (5)

and 10–100 mol percent of benzanilide units of the formula,

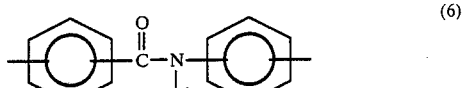 (6)

based on total phenylene and benzanilide units, where $R^1$ is as previously defined.

Among the radicals within the scope of R of Formulas (1) and (4), there are included, for example,

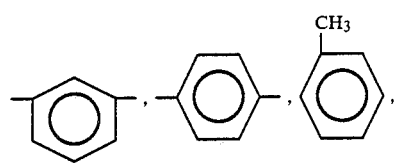

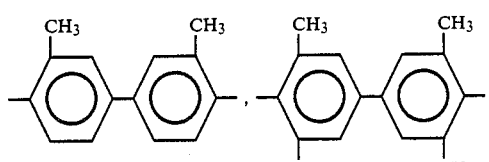

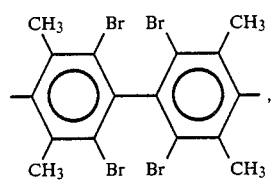

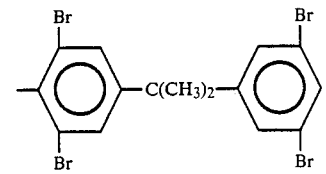

and divalent organic radicals of the general formula,

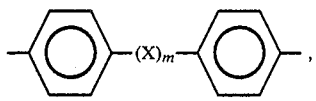

where X is a member selected from the class consisting of divalent radicals of the formulas

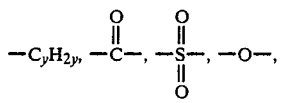

and —S—, where m is 0 or 1, y is a whole number equal to from 1 to 5 inclusive.

Included within the aromatic bis(etheranhydrides) of Formula (1) are compounds selected from

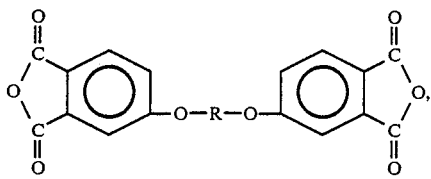

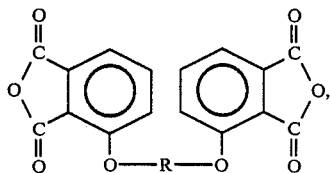

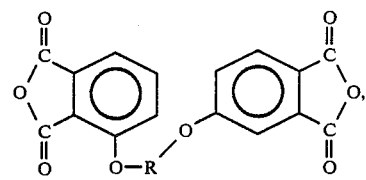

where R is as previously defined. The dianhydrides of Formula (1), which preferably include 2,2-bis[4-(2,3-dicarboxyphenoxy)]propane dianhydride and 2,2-bis[4-(3,4-dicarboxyphenoxy)]propane dianhydride, can be made by effecting reaction between a nitrophthalimide and an alkali diphenoxide, as shown by Heath et al., U.S. Pat. No. 3,879,428, assigned to the same assignee as the present invention and incorporated herein by reference.

Included by the above described alkali diphenoxide salts of U.S. Pat. No. 3,879,428 are sodium and potassium salts of the following dihydric phenols:
2,2-bis-(2-hydroxyphenyl)propane,
2,4'-dihydroxydiphenylmethane,
bis-(2-hydroxyphenyl)methane;
2,2-bis-(4-hydroxyphenyl)propane hereinafter identified as "bisphenol-A" or "BPA",
1,1-bis-(4-hydroxyphenyl)ethane,
1,1-bis-(4-hydroxyphenyl)propane,
2,2-bis-(4-hydroxyphenyl)pentane,
3,3-bis-(4-hydroxyphenyl)pentane,
4,4'-dihydroxybiphenyl,
4,4'-dihydroxy-3,3,5,5'-tetramethylbiphenyl,
2,4'-dihydroxybenzophenone,
4,4'-dihydroxydiphenylsulfone,
2,4'-dihydroxydiphenylsulfone,
4,4'-dihydroxydiphenyl sulfoxide,
4,4'-dihydroxydiphenyl sulfide,
hydroquinone,
resorcinol,
3,4'-dihydroxydiphenylmethane,
4,4'-dihydroxybenzophenone, and
4,4'-dihydroxydiphenylether.

Additional diaminobenzanilides included within Formula (2), are compounds where $R^1$ is $C_{(1-8)}$ alkyl, such as methyl, ethyl, propyl, phenyl or substituted aromatics which are neutral during condensation. Phenylenediamine included within formula (3) are for example m-phenylene diamine, p-phenylenediamine and o-phenylenediamine.

If desired, other organic diamines can be used in combination with PDA of Formula (3) such as
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-diaminotoluene,
2,6-diaminotoluene,
2,4-bis($\beta$-amino-t-butyl)toluene,
bis(p-$\beta$-methyl-o-aminopentyl)benzene,
1,3-diamino-4-isopropylbenzene,
1,2-bis(3-aminopropoxy)ethane,
m-xylylenediamine,
p-xylylenediamine,
bis(4-aminocyclohexyl)methane,
decamethylenediamine,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
bis(3-aminopropyl)tetramethyldisiloxane, etc.

In the practice of the method of the invention, substantially equal molar amounts of BPA-DA and DABA, or a mixture of DABA and PDA are heated under neat conditions under a nitrogen atmosphere with mechanical agitation at a temperature in the range of from 330° C. to 370° C. Reaction time can vary from about 30 minutes depending upon the degree of agitation and the reactants utilized. In instances where the amount of DABA is less than about 50 mol percent of the total organic diamine utilized in the mixture, organic solvent can be used to facilitate the removal of water of reaction from the mixture.

Suitable organic solvents are, for example, o-dichlorobenzene, chlorobenzene, xylene, toluene; dipolar aprotic solvents such as dimethylacetamide, N,N-dimethylformamide.

The resulting polyetheramideimide formed during the reaction can be reinforced with inert fillers such as silica, carbon alumina. Reinforcement can be achieved by utilizing from 10 to 50 parts of filler by weight per hundred parts of polyetherimide.

The polyetheramideimides made in accordance with the practice of the present invention are useful as injection moldable, solvent resistant thermoplastics. In addition, they can be converted to tough flexible films by thin film evaporation of the corresponding polyamic acid or by molding between Teflon resin sheets at high pressure.

In order that those skilled in the art will be better able to practice the present invention, the following examples are given by way of illustration and not by way of limitation. All parts are by weight. As used hereinafter, the term "BPA-DA" means 2,2-bis[4-(3,4-dicarboxyphenoxy]propane dianhydride.

EXAMPLE 1

A mixture of 1.74 grams (0.00768 mol) of 4,4'-diaminobenzanilide and 4.0 grams (0.00768 mol) of BPA-DA were heated under nitrogen under a nitrogen atmosphere with mechanical agitation at 350° C. for 30 minutes. During this time, water was evolved and a viscous polymer was formed. Glass transition temperature of the polymer were measured at 237° C. No observable endotherm was observed up to 410° C., as shown by AD as DSC scan. Based on method of preparation, the resulting product was a polyetheramideimide consisting essentially of chemically combined bis-phenol-A etherimide units and benzanilide units. The polyetheramideimide was found to be totally insoluble in methylene chloride and orthodichlorobenzene. No swelling or crystallization of the polymer was observed in methylene chloride after 48 hours.

EXAMPLE 2

A mixture of 22.7 grams (0.0436 mol) of BPA-DA, 1.02 grams (0.0045 mol) of 4,4'-DABA and 4.36 grams (0.04303 mol) (metaphenylenediamine), 0.399 grams (0.00269 mol) of phthalic anhydride, and 0.008 grams of sodiumphenylphosphonate was heated at reflux in 88 grams of orthodichlorobenzene solvent. Water of reaction evolved and it was removed by means of a condenser trap. After the water of reaction had been removed, the mixture was heated for an additional four hours at reflux. The product was precipitated in methanol and dried in vacuo at 130° C. for 48 hours. There was obtained a polymer having a glass transition temperature of 228° C. and an intrinsic viscosity of 0.433 in orthodichlorobenzene. Based on method of preparation, the polymer was a polyetheramideimide consisting essentially of chemically combined BPA-DA imide units, DABA units, metaphenylene units, chain stopped with phthalimide units. The polymer was found to possess improved solvent resistance to methylene chloride and orthodichloro benzene as compared to polyetherimide made in accordance with the same method free of DABA units.

EXAMPLE 3

A mixture of 2.6 grams (0.005 mols) of BPA-DA and 4,4'-diaminobenzanilide and 17 ml of N,N-dimethylacetamide were stirred for about 10 minutes under an argon atmosphere and thereafter stirred at 60° C. for up to 14 hours. During this time, the viscosity of the pink solution increased dramatically. Several drops of the clear viscous solution were placed on a microscope slide; a film of the thickness of 10 mils was drawn out on a slide using a doctor blade. The solvent in the film was allowed to evaporate at room temperature. Thereafter, the slide was then heated at 100° C. for 20 minutes, 220° C. for 20 minutes, and about 350° C. for 40 minutes. The slide was then placed in boiling water to facilitate the removal of the resulting thin film. The thin film was found to be very tough without any sign of brittleness.

The above procedure was repeated except that in place of the 4,4'-diaminobenzanilide there was utilized an equal molar mixture of bis-phenylenediamine and the 4,4'-diaminobenzanilide. In addition, polyetheramideimide homopolymers were prepared utilizing equal molar mixtures of BPA-DA and 4-aminophenyl-3-aminobenzanilide, 3-aminophenyl-4-aminobenzanilide, and 3-aminophenyl-3-aminobenzanilide. The following results were obtained:

|  | $T_g$ (C.°) | $T_m$ (C.°) |
| --- | --- | --- |
| DABA/PDA (50/50) | 242 | NO |
| 4,3'-diaminobenzanilide | 248 | " |
| 3,4'-diaminobenzanilide | 249 | " |
| 3,3-diaminobenzanilide | 240 | " | where $T_g$ is the glass transition temperature, $T_m$ is the melting temperature and NO is "not observed".

The above Table shows polyetheramideimides which were made by utilizing the indicated diamine. These polymers formed thin, tough, films from the corresponding polyetheramide acids. The polyetheramideimides were found to be solvent resistant in methylene chloride, as shown by no swelling of the polymeric film after immersion in methylene chloride for 48 hours.

EXAMPLE 4

A mixture of equal molar amounts of BPA-DA and 4,4'-diaminobenzanilide were shaken in a sealed container for 10 minutes to effect good mixing of the solids. The mixture was then added to a Brabender-type mixing vessel which had been preheated to 375° C. The solid material melted and bubbles were apparent, indicating water evolution. The resulting material was allowed to remain in the Brabender for 5 minutes. A brown product was removed from the mixing blades and bowl. A portion of the product was pressed into a tough and flexible film by molding between two Teflon sheets at 375° C. under two tons of pressure for about five minutes. Based on method of preparation, the product was a polyetheramideimide consisting essentially of chemically combined units of Example 1.

A DSC of the 4,4'-diaminobenzanilide polyetheramideimide showed the following:
A. Solution polymerized polymer $T_g = 260°$ C., $T_m = 385°$ C.;
B. Thin film/amide acid polymerized polymer $T_g = 260°$ C., $T_m = 375°$ C.; and
C. Melt polymerized polymer $T_g = 255°$ C., $T_m = 368°$ C.

Thermomechanical analysis (TMA) of the above polyetheramideimide showed the following:
A. Thin film/amide acid polymerized polymer—transitions were observed at ca. 260° and 360° C.;
B. Melt polymerized polymer—transition were observed at ca. 250° C. and 355° C.

The above DSC and TMA analyses establish that the polyetheramideimides of the present invention are significantly different from the polyetherimide of Heath et al. with respect to $T_g$ of about 260° C. as compared to the $T_g$ of the prior art polyetherimide of about 220° C. In addition the polyetheramideimide of the present invention have $T_m$'s of about 368°–385° C. which are not shown by the polyetherimide of the prior art. Improved solvent resistance with respect to methylene chloride, meta-cresol, N-methylpyrrolidone, dimethylacidamide, acetone, and dimethylsulfoxide are also exhibited by the polyetheramideimides of the present invention.

Although the above examples are directed to only a few of the very many variables which can be utilized in the practice of the present invention, it should be understood that the present invention is directed to a much broader variety of BPA-DA, as shown by Formula (1), and DABA as shown by Formula (2), or a mixture thereof with BPA as shown by Formula (3), as well as the solvents and conditions used in making such polyetheramideimides.

What is claimed and sought to be protected by Letters Patent of the United States is as follows:

1. Solvent-resistant moldable polyetheramideimide having a $T_g$ in the range of from about 228° C.–260° C. comprising chemically combined amideimide units of the formula,

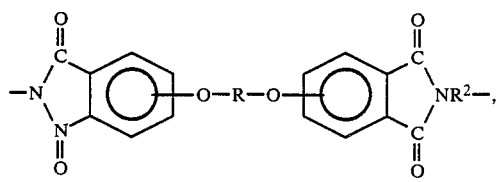

where R is a $C_{(6-30)}$ divalent aromatic organic radical, $R^2$ is selected from benzanilide units of the formula,

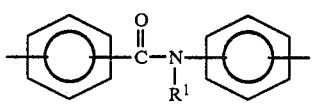

or a mixture of such benzanilide units and up to 90 mol percent of phenylene units of the formula based on the total moles of benzanilide units and phenylene units,

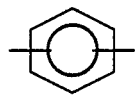

and $R^1$ is a $C_{(1-14)}$ monovalent hydrocarbon radical or $C_{(1-14)}$ monovalent hydrocarbon radical substituted with neutral radicals.

2. A solvent resistant polyetheramideimide of claim 1, where R is

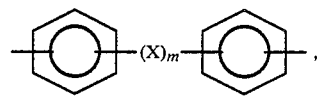

where X is a member selected from $C_yH_{2y}$,

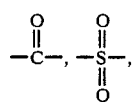

or O, m is 0 or 1, and y is a whole number equal to 1 to 5, inclusive.

3. A solvent resistant polyetheramideimide of claim 2, where R is

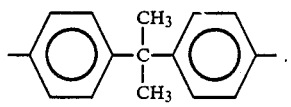

4. A crystalline polyetheramideimide consisting essentially of chemically combined polyetheramideimide units of the formula,

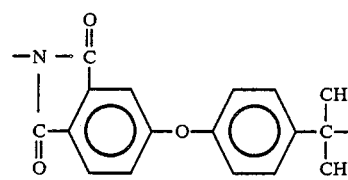
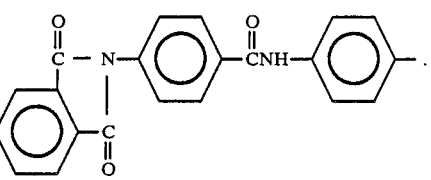

5. A solvent resistant polyetheramideimide, in accordance with claim 1, where $R^2$ is a 4-aminophenyl-3-aminobenzanilide unit.

6. A solvent resistant polyetheramideimide, in accordance with claim 1, where $R^2$ is a 3-aminophenyl-4-aminobenzanilide unit.

7. A solvent resistant polyetheramideimide, in accordance with claim 1, where $R^2$ is a 3-aminophenyl-3-aminobenzanilide unit.

* * * * *